(12) United States Patent
Sparling

(10) Patent No.: US 9,199,735 B2
(45) Date of Patent: Dec. 1, 2015

(54) APPARATUS FOR PROCESSING AND DISPENSING INCENDIARY CAPSULES

(71) Applicant: Frederick Sparling, St. John's (CA)

(72) Inventor: Frederick Sparling, St. John's (CA)

(*) Notice: Subject to any disclaimer, the term of this patent is extended or adjusted under 35 U.S.C. 154(b) by 205 days.

(21) Appl. No.: 14/061,511

(22) Filed: Oct. 23, 2013

(65) Prior Publication Data

US 2014/0283672 A1 Sep. 25, 2014

(30) Foreign Application Priority Data

Dec. 7, 2011 (CA) ...................................... 2761242

(51) Int. Cl.
*F42B 12/44* (2006.01)
*B64D 1/06* (2006.01)

(52) U.S. Cl.
CPC .. *B64D 1/06* (2013.01); *F42B 12/44* (2013.01)

(58) Field of Classification Search
CPC ............ F42B 12/44; F42B 12/46; F42B 7/00; B64F 1/16; B64F 1/04; A62C 3/0285; A62C 3/0278
USPC ............. 102/364, 365, 357; 124/78, 79, 51.1, 124/82; 169/33; 89/1.51
See application file for complete search history.

(56) References Cited

U.S. PATENT DOCUMENTS

| 6,877,433 | B1 | 4/2005 | Stevenson | |
|---|---|---|---|---|
| 7,275,529 | B2* | 10/2007 | Boys | 124/66 |
| 7,451,679 | B2 | 11/2008 | Stevenson | |
| 8,316,750 | B2* | 11/2012 | Toeckes et al. | 89/1.51 |
| 8,601,929 | B2* | 12/2013 | Stevenson | 89/1.51 |
| 8,776,693 | B2* | 7/2014 | Toeckes et al. | 102/364 |
| 2006/0027380 | A1* | 2/2006 | Stevenson et al. | 169/45 |
| 2006/0169263 | A1* | 8/2006 | Boys | 124/66 |
| 2010/0101401 | A1 | 4/2010 | Toeckes et al. | |
| 2010/0282230 | A1* | 11/2010 | Toeckes et al. | 124/71 |
| 2013/0061738 | A1* | 3/2013 | Stevenson | 89/1.51 |

* cited by examiner

*Primary Examiner* — Benjamin P Lee
(74) *Attorney, Agent, or Firm* — Frank J. Bonini, Jr.; John F. A. Earley, III; Harding, Earley, Follmer & Frailey, P.C.

(57) ABSTRACT

An apparatus for processing and dispensing incendiary capsules is provided. The apparatus includes a hollow tube which serves as a cylinder within which is located a reciprocal piston or a plurality of co-axially mounted pistons driven by a cam. When this coordinated cycle begins with the piston assembly in its full-down position, and the cam assembly is then rotated 360 degrees, the piston assembly will proceed to its full-up position and then back to its full-down position. During this cycle, the following occurs in order: (1) an incendiary is received and enclosed within the piston assembly, that incendiary is then (2) pierced by a needle, then (3) injected with reactant, then (4) the needle is withdrawn from the incendiary, and finally (5) the incendiary is expelled from the cylinder. The feeder is operatively connected with the cam-piston assembly and feeds each individual incendiary into the piston assembly.

32 Claims, 17 Drawing Sheets

FIG. 1A (Back)　　　　　　　　　　　　　　FIG. 1B (Front)

FIGURE 5
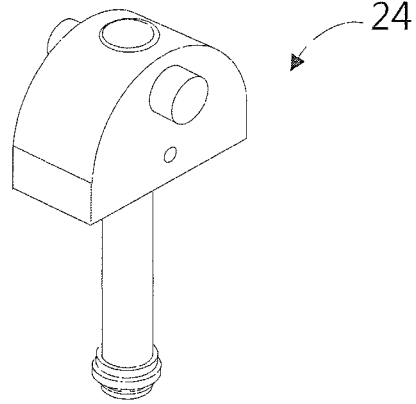
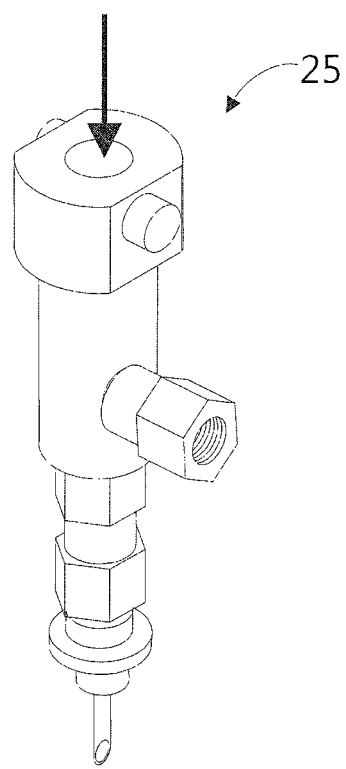
Fig. 5A
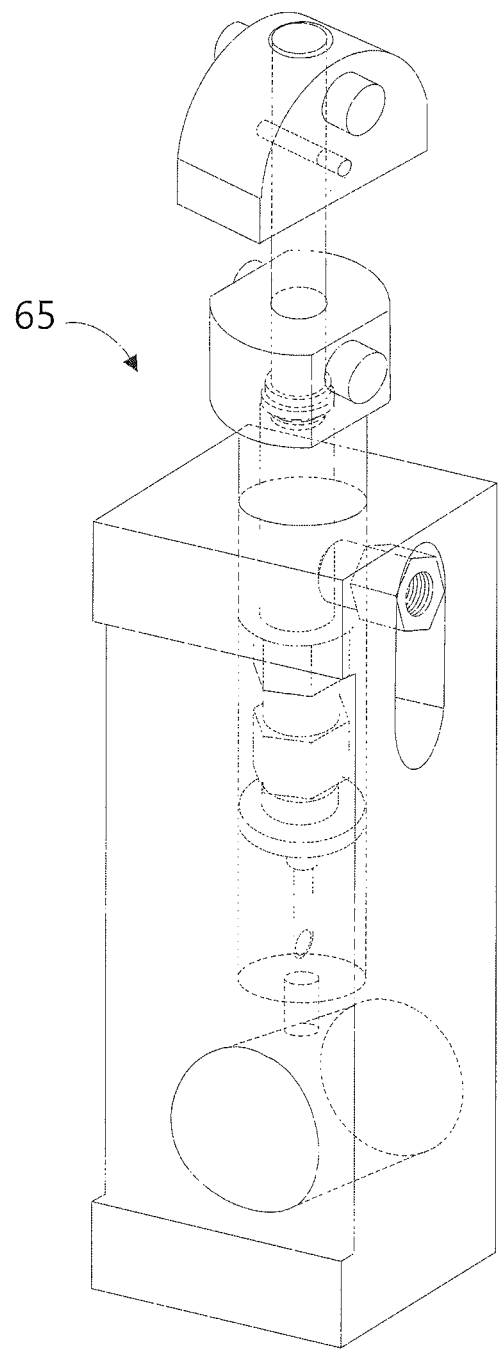
Fig. 5B

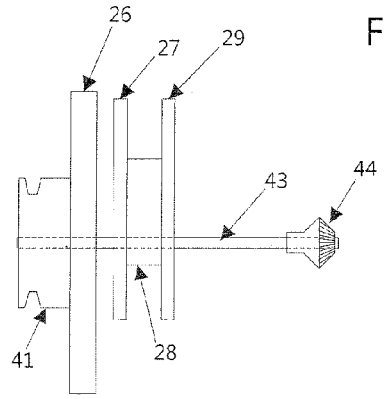
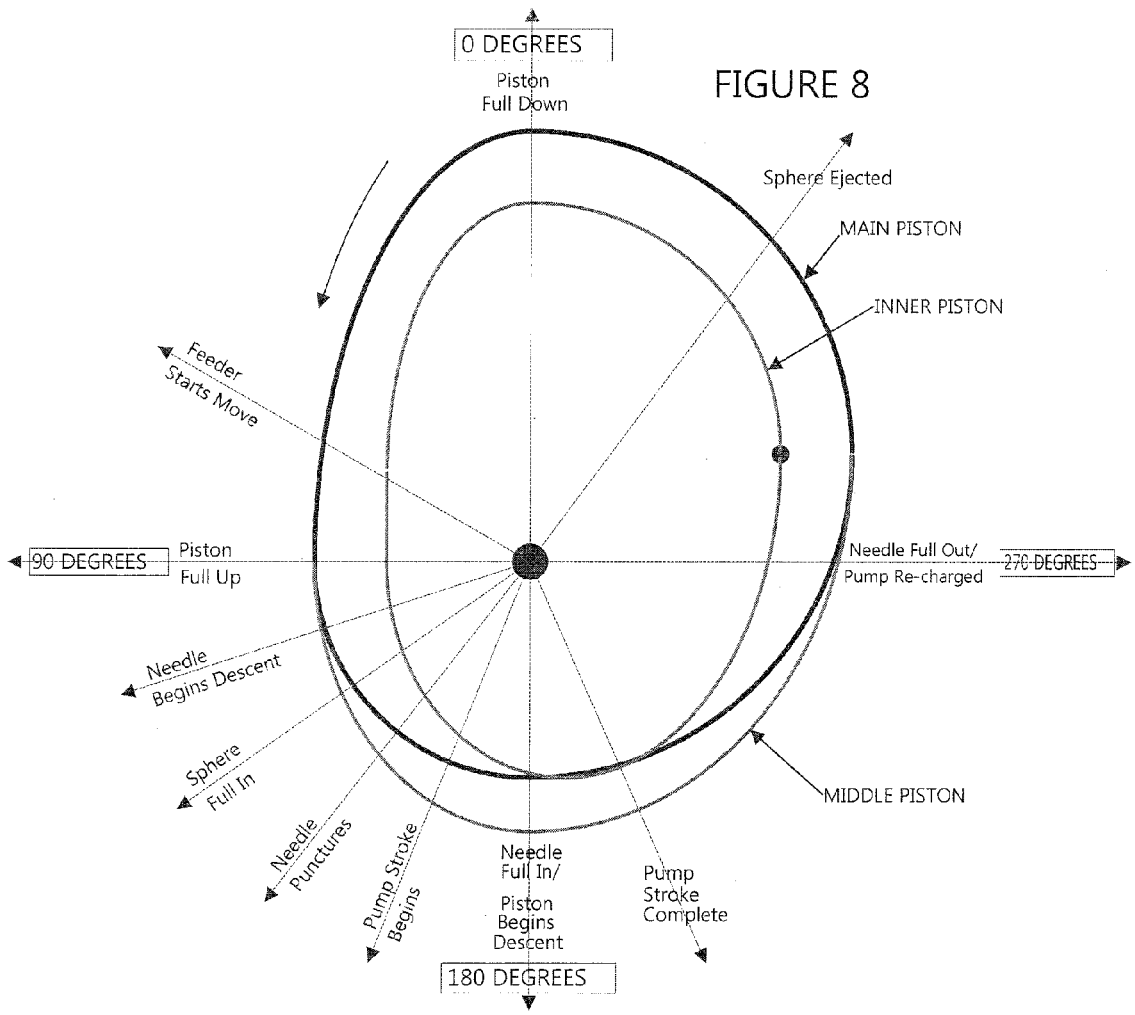

FIGURE 9
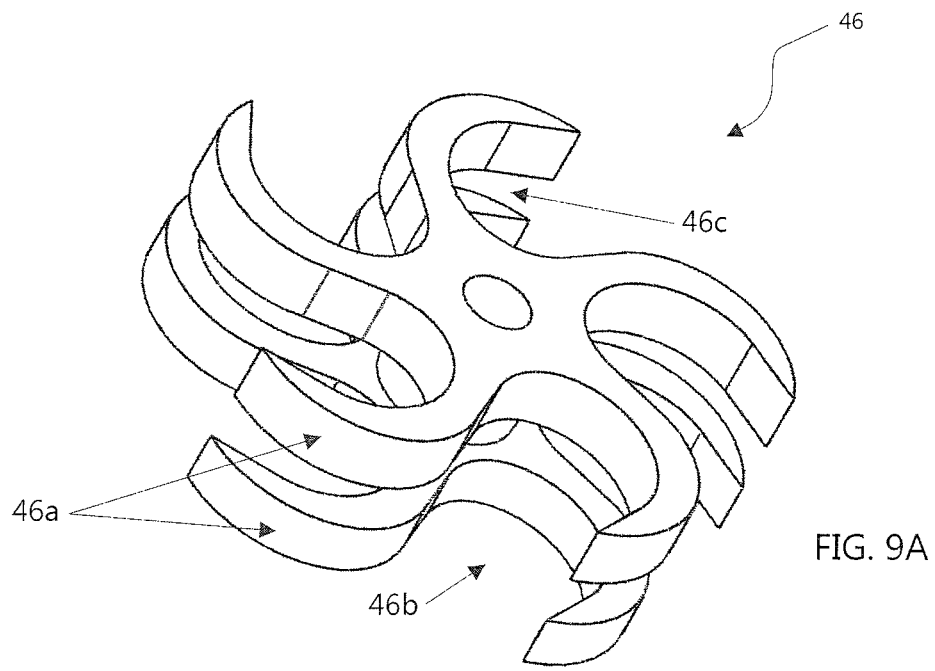
FIG. 9A
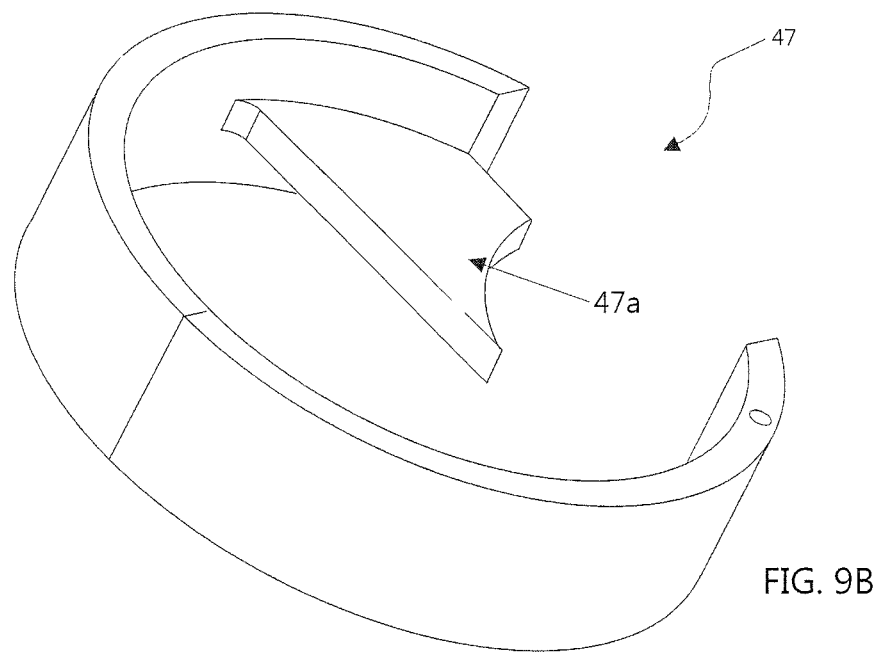
FIG. 9B

45

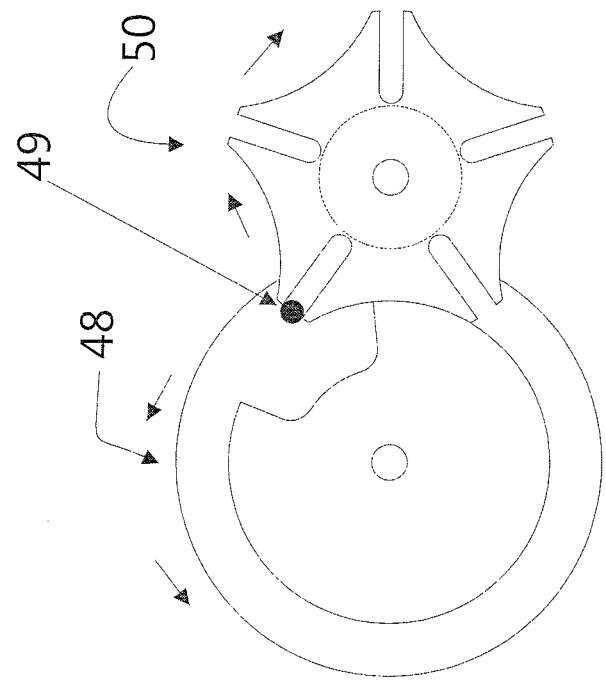
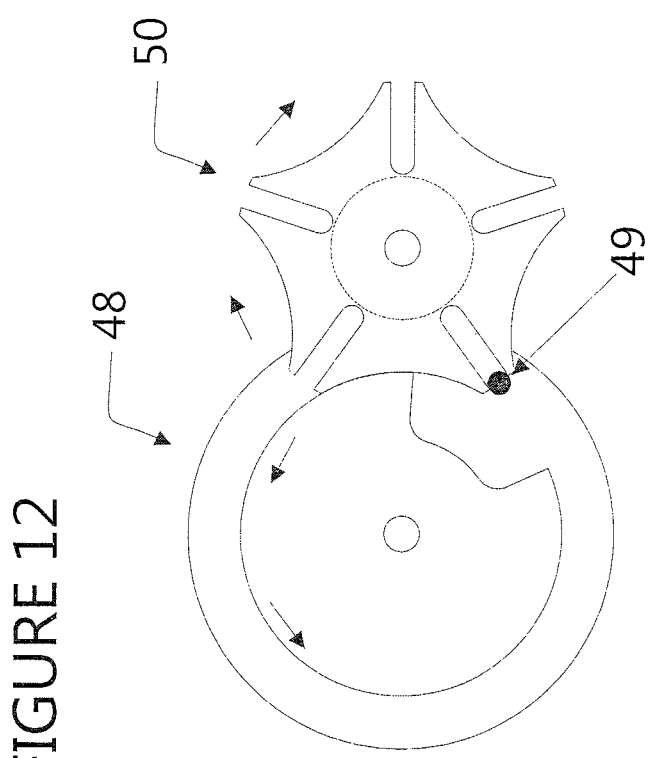
FIGURE 12
Fig 12B
Fig 12A

Towards Cylinder →

FIGURE 17
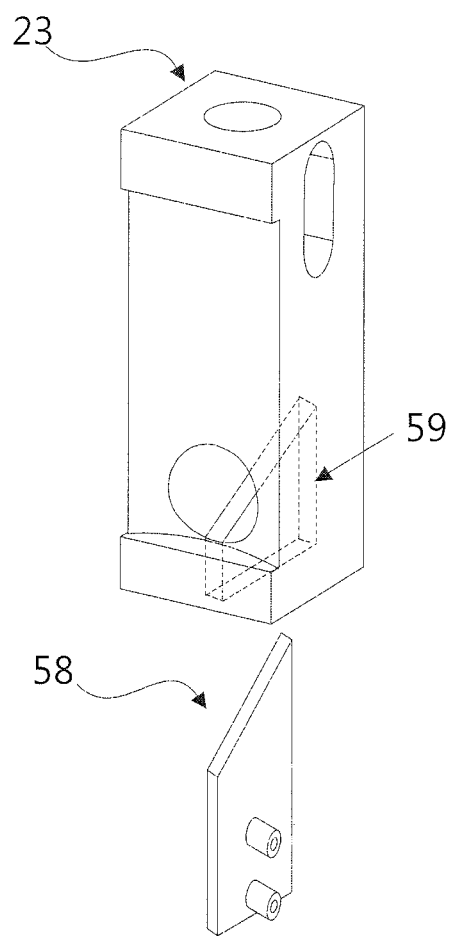
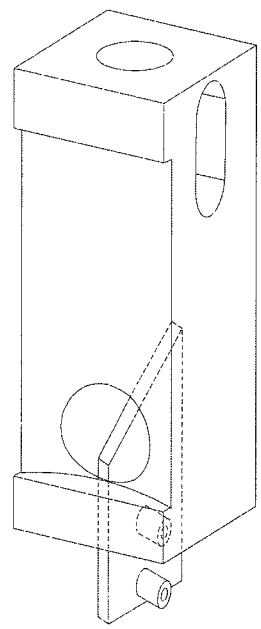
Fig. 17A	Fig. 17B

FIGURE 18
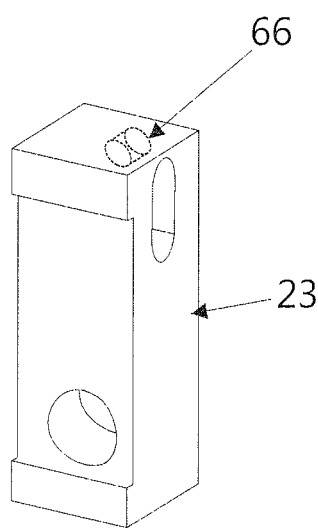
FIG.18A
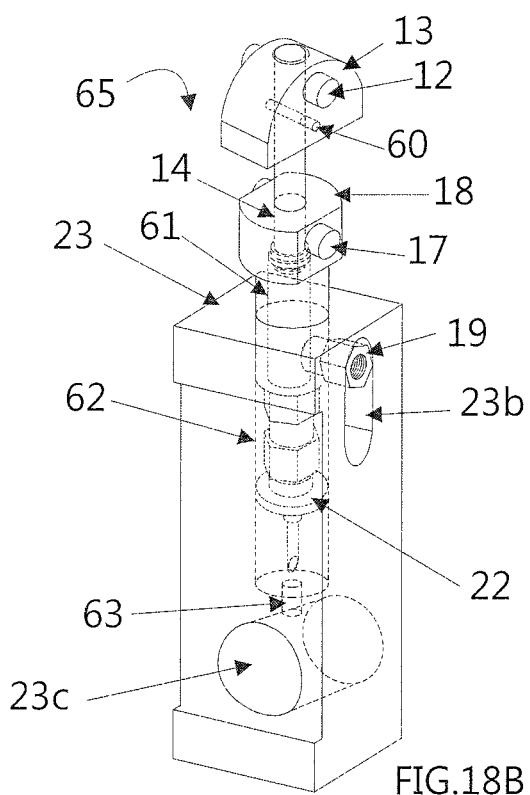
FIG.18B

FIGURE 19
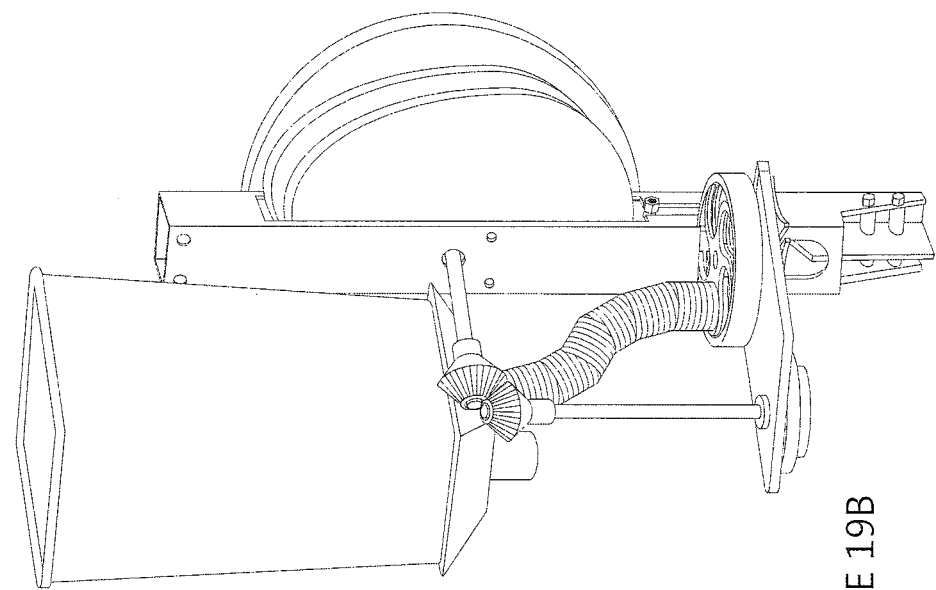
FIGURE 19B
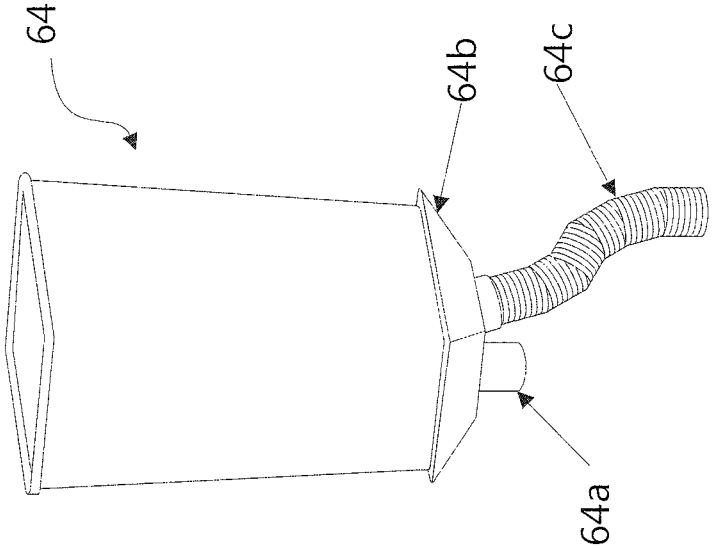
FIGURE 19A

APPARATUS FOR PROCESSING AND DISPENSING INCENDIARY CAPSULES

BACKGROUND OF THE INVENTION

1. Field of the Invention

This invention relates to intentional burning, often called 'prescribed burning' for wild-land and wildlife management purposes, and in particular to an apparatus for processing and dispensing incendiary capsules for the purpose of conducting such prescribed burning.

2. Brief a Description of Related Art

Prescribed burning is a common activity that is well recognized to produce many wild-land, environmental, agricultural and wildlife benefits. A variety of methods and devices are employed to do this. One main methodology uses flammable liquid or, flammable sludge, which is ignited as it exits the ignition device. Examples of such devices range from hand held 'drip torches' to helicopter slung 'heli-torches', or to vehicle-mounted or vehicle-towed devices, often called 'terra-torches', which eject ignited fuel under pressure much as does a military-type flamethrower. All flammable liquid methods carry with them certain disadvantages. The first such disadvantage is the obvious potential danger to the personnel who operate these devices. Such danger may arise for instance as an unintended consequence of misdirected flame, or possibly by explosion. Secondly, although such devices are effective for starting fires, they tend to consume a large quantity of fuel relative to both the number of fires they start, and to the total area they burn; consequently the ongoing need to re-fuel these devices, which includes the storage, transportation, and often mixing of fuel, imposes a significant operational challenge in the field. This re-fueling requirement also adds environmental risk and significant expense. Thirdly, there exist several physical limitations regarding the design, construction, and operation of any mechanical device which processes and ignites flammable liquids. Such limitations can be related for instance to the need to avoid fuel or flame leakage, or to mitigate the consequences if such leakage occurs, or to other design restrictions due to the potentially detrimental affect of burning fuel upon the mechanical or electrical components of the device. These are some of the reasons why it is desirable to design and employ an ignition apparatus which processes neither flammable liquid, nor flame itself.

One existing method of igniting prescribed burns which avoids the need to emit ignited liquids is that commonly referred to as 'delayed ignition'. The most common method of delayed ignition is a machine that processes plastic incendiary capsules. Each plastic capsule is partly filled with an incendiary such as potassium permanganate, and, as the capsule is processed within the machine it is injected with a reactant such as ethylene glycol. As a result, after a delay of about 20-40 seconds, the now-mixed chemicals react with one another to create flame, which then causes the plastic capsule to burn. This burning capsule becomes the source of ignition for whatever ground material is intended to be burnt. The main advantage of delayed ignition is the delay itself. This is what allows for a method, or device, that does not have to process actual flame with all of the difficulties associated with doing so, but rather it processes what can be referred to as a 'pre-flame' incendiary capsule. This 'delayed ignition' technique is the method employed in the present invention.

It is often desirable to conduct prescribed burning from the air. This is especially true if the terrain is difficult or impossible to traverse by ground, or if the area to be burnt is very large in which case the time required to do so by traditional ground based methods may exceed the time window within which optimal burning conditions (wind speed and direction, temperature, relative humidity, etc.) can be expected to persist. When prescribed burning is conducted from the air, this is usually done by helicopter. This can be done by 'Heli-torch' as previously mentioned, or, it is also known to install a 'delayed-ignition dispenser' within the cabin of the helicopter. Such a dispenser is capable of producing 'charged', or injected spheres, which are dropped by gravity from the aircraft to the ground. There are at least three helicopter-deployed delayed-ignition dispensers currently in use, and at least one ground deployed delayed-ignition device:

One such helicopter device is described in U.S. Pat. No. 7,451,679 (Inventors: R. Stevenson and P. Hanbury, Assignee: Raindance Systems Pty Ltd., hereinafter referred to as "Raindance"). This device is designed to be used in combination with a specific 'series-connected' incendiary (separate U.S. Pat. No. 6,877,433) which is a flexible belt comprising a large number of connected incendiaries which are fed into Raindance in a manner similar in general principle to that of an ammunition belt that is fed into a machine gun; each incendiary is in turn injected, then led to a cutter which separates it, then drops it upon the ground. As noted in the patent document one of the main improvements sought by Raindance, in particular by means of its positive feeding system, is the elimination of the jamming problem that is often associated with other prescribed burning devices that process individual spheres fed from a hopper. The manner in which Raindance has overcome this problem however still leaves two disadvantages compared with a device that dispenses spheres. The first is caused by the irregular shape of the resultant incendiary. While the symmetrical aerodynamics of a sphere ensure the predictability of that sphere's path when falling through the air, irregular shapes, especially lightweight irregular shapes, are subject to flutter and to unpredictable flight patterns, and, they are also more subject to becoming hung up in the forest's canopy in cases where it is the forest's undergrowth that is the object of the prescribed burning, whereas a sphere is much more likely to reach the ground. Secondly, the Raindance incendiaries provide less thermal energy for ignition purposes than does the inherently more-dense sphere. This relates directly to the fact that the thermodynamic chemical reaction, although it does produce a short-duration intense flame, is not itself the main useful source of ignition the primary purpose of this reaction is to ignite the outer plastic shell so that the plastic becomes, with its much higher thermal energy and flame duration, the source of ignition for the desired prescribed burning.

There are at least two helicopter deployed delayed-ignition devices in use which do use sphere-shaped incendiaries, and both employ a similar basic methodology. One is the Mark III from Premo Plastics and the other is the Red Dragon from SEI Industries. The Red Dragon is the subject of PCT Patent WO 2008/104061 A1. With both of these devices a quantity of plastic spheres, which have been pre-filled with a set volume of incendiary material are deposited into a hopper. When the device is activated individual spheres are caused, in reaction to a combination of agitation and gravity, to line up within downward sloping groves, or 'chutes' which have their exit in a chamber within which individual spheres are injected with a liquid reactant (the Mark III can employ up to four parallel chutes, the Red Dragon has two). To inject each sphere that enters this chamber, it is first forced horizontally onto contact with a hollow needle until the needle pierces the ball's surface, then a valve is opened and reactant is pumped into the sphere, then the valve is closed. Next, the ball is moved horizontally in the opposite direction thus withdrawing the needle from the ball, and finally the ball is maneuvered into alignment with an opening through which it falls towards the ground below. Neither of these devices employ underlying mechanical principles which ensure continual 'possession' of each individual sphere during its progress through the machine. Instead, their process is oriented towards the sequential treatment of a collective stream of balls in a manner whereby each ball in series is exposed to a certain motion or treatment as it progresses through the various 'stations' within the machine, and as a consequence, once in a while a ball can jam somewhere along the process. Occasionally, this will be a ball which has been injected with reactant but does not exit, in which case a fire will occur within the machine. When this occurs, the operator is directed to activate an emergency water supply. Both the Mark III and the Red Dragon are complex machines in comparison to the present invention, and thus are more difficult to operate and are more difficult to maintain. Also, because of this complexity they are less capable of operating at high cycle speed. High cycle speed is desirable for prescribed burning in mainly two instances, which are: first, when attempting to burn material that is not in readily flammable condition, in which case it is desirable to apply a greater number of incendiaries in order to effect more thorough ignition, and second, whenever aerial ignition is desired to be conducted at higher groundspeeds.

A series of delayed-ignition devices are produced by Field Support Services of Florida. The PyroShot (U.S. Pat. No. 7,275,529) is a spring loaded 'hand launcher for ground ignition' which indicates, of course, that it is intended for use by personnel while walking on foot. The same company has also produced an HS model which includes a CO2 tank for the purpose of propelling the charged sphere for a longer distance. Further, the same company, in partnership with another company has recently introduced its Green Dragon product. The Green Dragon also employs pressurized CO2 to launch each sphere over a long distance, and it is apparently normally mounted on an ATV type vehicle as opposed to being used by a person on foot. All three products are intended exclusively for use as a ground, as opposed to aerial, application. A review of the original patent indicates that PyroShot's mechanisms for performing the main basic tasks of (1) feeding a sphere into the machine, (2) injecting reactant into the sphere, and (3) ejecting the sphere from the machine are fully dissimilar to the mechanisms employed in the present invention. For these reasons it would not appear to be necessary to further discuss the PyroShot products in the context of relevant prior art.

The applicant is aware of no other 'delayed-ignition' devices in addition to those described above.

SUMMARY OF THE INVENTION

The general objective of the present invention is to provide a delayed-ignition apparatus that can be deployed by helicopter that is safe, simple, reliable, capable of high cycle speed, and is easy to operate and easy to maintain. The main mechanisms employed to accomplish these objectives are mechanical, as opposed to electrical or pneumatic or any other non-mechanical means. This is not intended to indicate that electrical or pneumatic motive power, or electrical controls or cycle counters, etc., are not envisioned as components of the final market embodiment of the present invention, indeed the opposite is true, but it does mean that the basic functions of the apparatus are accomplished by mechanical means alone. It is possible, for instance, to manually rotate the apparatus and thereby cause an incendiary sphere to: (1) be fed into a close-tolerance cavity within the apparatus where it will then (2) become pierced by a needle through which (3) reactant is then pumped, followed by (4) withdrawal of the needle from the sphere, then finally, (5) ejection of the 'charged' sphere from the apparatus into a discharge assembly. This mechanical process, which is activated by the rotation of a cam assembly, avoids the possibility of a charged sphere remaining within the apparatus, and it can be repeated at high speed.

The central component of the present invention is a square hollow tube. Mounted within that tube is a piston assembly. In the preferred embodiment, this piston assembly includes three co-axial pistons mounted one within another, in other words a piston within a piston within a piston. The outer piston mounts the middle piston and is used to maneuver the incendiary sphere, the middle piston mounts the inner piston and serves as an injection needle, and the inner piston acts as a pump (i.e. in the same manner that a syringe acts as a pump). The reciprocating motion of all three pistons is controlled by the rotational movement of a cam assembly. Engraved in each of the three different surfaces of this cam assembly is a groove within which rides a lug, or two lugs in the case of the two innermost pistons, that is attached to each piston. When the cam assembly is rotated, the 360 degree groove path in each cam, combined with the lug that is attached to each piston and which is riding within that groove, will independently control the displacement, speed and direction of the reciprocating motion of each of the three pistons. The cam assembly is mounted on a shaft, and this shaft is mounted above the pistons and perpendicular to the cylinder. This shaft is extended on its front end and capped by a 45 degree miter gear which mates with a second identical 45 degree miter gear that caps the upper end of a vertically mounted second shaft thus forming a second driveshaft that rotates in unison with the main shaft, but at a 90 degree angle. At the end of this second shaft is a 'Geneva Drive' gear. A Geneva Drive is a two-part gear which is used for intermittent drive. Its drive gear includes a pin and a partial circle; it's driven gear, sometimes called a 'Geneva Cross" (and herein sometimes referred to simply as "the cross") includes slots that are rotated by the pin, and semi-circles that lock the cross when it is not being driven. This Geneva drive is used to intermittently rotate a rotary ball-feeding mechanism which is mounted above the cross on the same shaft. Incendiaries are fed into this rotary ball feeding mechanism via a tube connecting it to the bottom of the hopper. This hopper can typically contain up to several hundred spheres. A certain amount of agitation is required to shake the spheres out of the hopper and in to the tube. Incendiaries lined up in this tube will fall in series, through simple gravity, into the cavities of the feeder as it rotates. Gravity alone is sufficient to cause the spheres to enter these cavities because, for the majority of the time, the feeder is stationary—it is to be remembered that the feeder's rotation is intermittent.—In the preferred embodiment described herein for example, the feeder is stationary for about 83% of the time.

Thus far we have described the main mechanisms which are employed to accomplish 4 of the 5 tasks previously listed (i.e.—all tasks except ball ejection). A review of the mechanisms relative to their effect upon the incendiary sphere as they accomplish these 4 tasks is as follows: First, a sphere is deposited in a cavity within the main piston by means of the partial rotation of the rotary ball-feeder; this occurs as the main piston reaches top dead center (TDC). Second, while the main piston remains at TDC, and while pinning the sphere in fixed position against the arm of the ball feeder that has deposited the sphere, which is now stationary (i.e. non-rotating), the middle piston descends and pierces the ball. Third, while the outer and middle pistons both remain stationary, the inner piston descends. As noted, this inner piston acts as a pump. On the lower end of the inner piston shaft is a seal which mates to the bore of the middle piston. The sphere thus becomes injected with liquid reactant. Fourth, all three pistons begin to descend, but during the initial period of their descent, not at the same rate. The outer piston, which holds the sphere in an internal cavity, descends at the highest rate; the middle piston, mounted in a bore in the outer piston, descends at a lesser rate thus causing the withdrawal of the needle from the sphere; while at the same time, the inner piston descends at a lesser rate than the middle piston within which it is mounted, thus causing the reloading of reactant. From this point until all three pistons are returned to TDC, the linear relationship between the three pistons remains fixed (i.e. the needle remains withdrawn and the pump remains charged). During the latter portion of the descent of this piston assembly, a fifth and final action relative to the sphere occurs which is the ejection of the sphere from the apparatus. As noted, during the first phase of the descent of the pistons, the needle is withdrawn from the sphere. This leaves the charged sphere sitting un-attached within a cavity in the still descending main piston. During the latter phase of the descent of the pistons, a sloped surface, or ramp, which is attached to the cylinder, enters through a slot in the main piston and makes contact with the sphere and pushes it out of the piston/cylinder. The sphere then falls through a vertical tube to the ground.

The mechanisms described above form the working basis for a delayed-ignition apparatus for prescribed burning which is designed for simplicity, safety, high speed, reliability, and ease of both operation and maintenance.

As a note of differentiation concerning the mechanical nature of the present invention in comparison to the sphere-processing delayed-ignition devices previously mentioned, it may be noted that, in contrast to those devices, the present invention includes no electric pumps, no on-off valves, no solenoids, and no other non-mechanical inputs necessary for its basic functionality.

BRIEF DESCRIPTION OF THE DRAWINGS

The drawings which show by way of example the preferred embodiment of the invention, are as follows:

FIG. 1A is viewed from the back, FIG. 1B is viewed from the front;

FIG. 5 is a perspective view of the pistons after they have been assembled; FIG. 5A shows the inner and middle pistons and FIG. 5B shows all three pistons assembled together;

FIG. 7 is a side view of the assembled cams;

FIG. 8 is a schematic diagram of the cam centerlines viewed from the front;

FIG. 9 is a perspective view of the rotary-feeder assembly; FIG. 9A is the rotary-feeder and FIG. 9B is the rotary-feeder housing;

FIG. 12 is an up view of the Geneva drive in use; FIG. 12A depicts the gear relationship just before the cross is rotated and FIG. 12B just after the cross is rotated;

FIG. 17 is a perspective view showing the relationship between the outer piston and the ejector plate, the outer piston is in the full up position in FIG. 17A and is in the full down position in FIG. 17B;

FIG. 18 is perspective views of the three pistons in their assembled position, FIG. 18A shows exterior detail and FIG. 18B shows interior detail;

FIG. 19 is perspective views of the hopper, FIG. 19A shows the hopper by itself and FIG. 19B shows the hopper in its installed position;

DETAILED DESCRIPTION OF THE PREFERRED EMBODIMENTS

Figure 1:
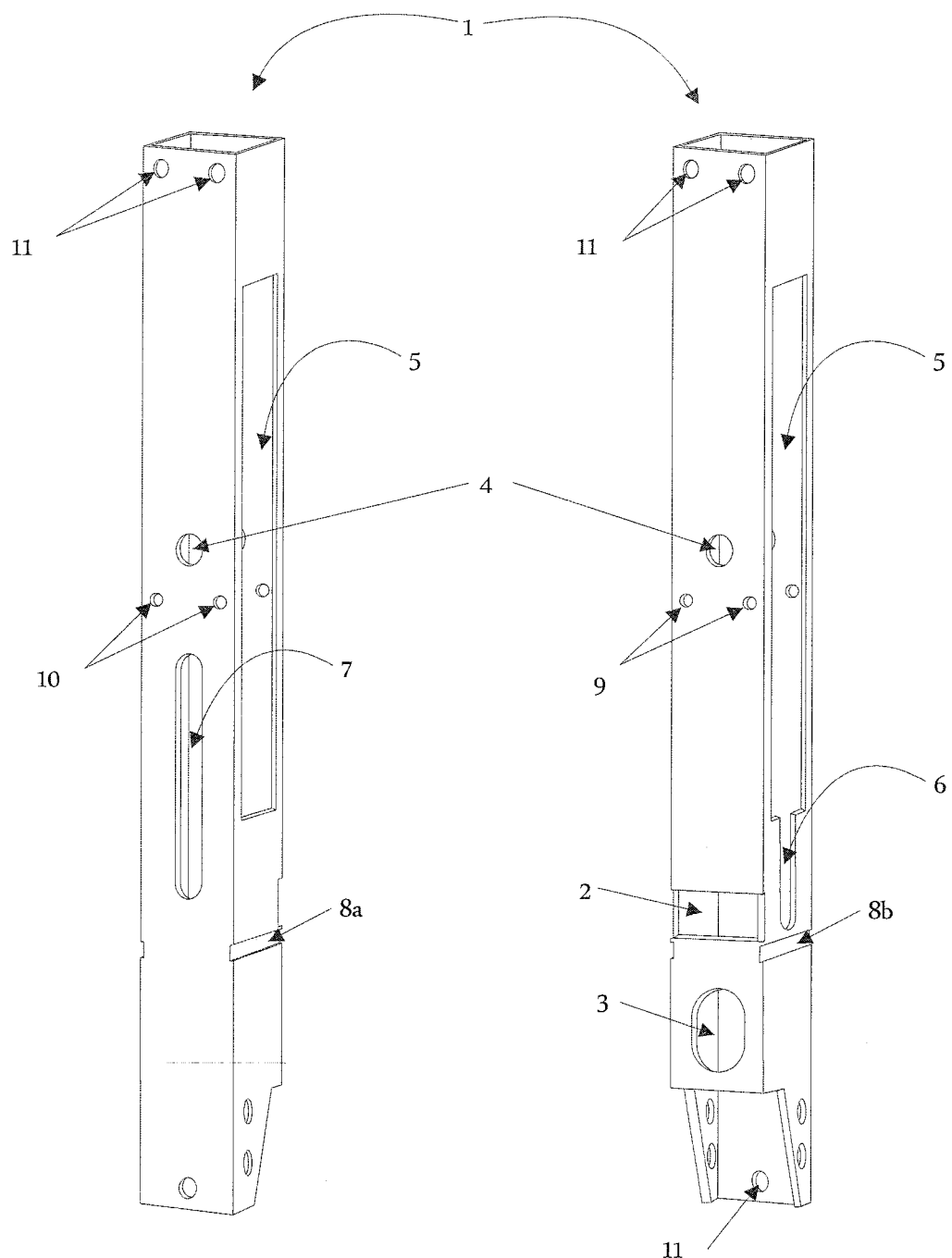
FIG. 1 is perspective views of the main cylinder.

The preferred embodiment of the present invention is shown in FIGS. 1 to 20. (NOTE: part numbers that are shown in brackets are parts that are shown elsewhere than on the drawing being referenced.)

FIG. 1 shows the cylinder 1. On the front of the cylinder as seen in FIG. 1B is the rectangular hole 2 through which incendiaries are fed into the cylinder, below this is exit hole 3 through which incendiaries exit the apparatus. Slot 6 provides clearance for the up-and-down motion of a reactant supply assembly (19,20). In FIG. 1A is shown another slot 7 which provides clearance for the up-and-down motion of a connecting rod (57). The remainder of the features shown in FIG. 1 are indicated on both FIG. 1A and FIG. 1B because they extend evenly from the front to the back of the cylinder; this includes mounting holes 11 which are used to mount the cylinder to its frame, and also holes 4 through which passes a main shaft (43). Also shown are holes 9 and which are used to mount a support plate, the only difference being that holes 9 are threaded, and holes 10 are clearance holes for a screwdriver. The large slots 5, on either side of the cylinder, are to allow clearance for a three-part cam which is mounted on, and rotates within, the cylinder. The grooves 8a and 8b, which are used to mount and align the feeder mount plate (56), extend only partially into the wall of the cylinder.

Figure 2:
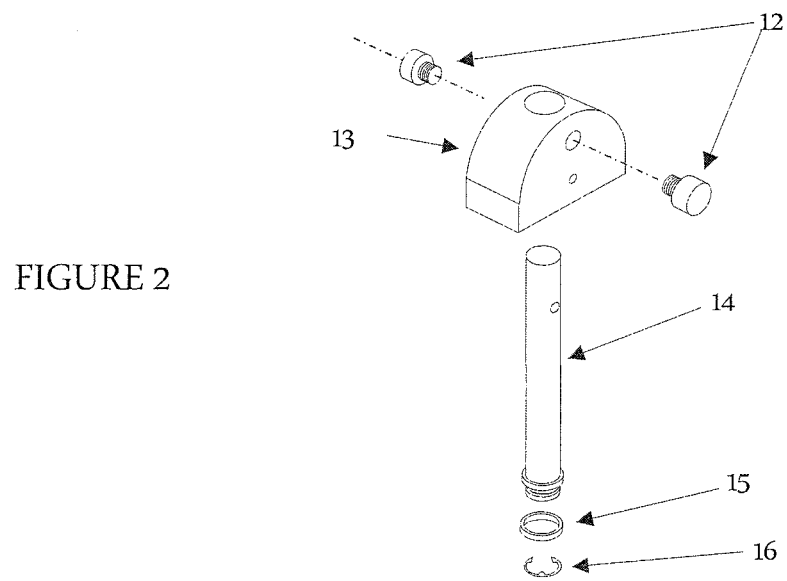
FIG. 2 is an exploded perspective view of the inner piston.

In addition to the aforementioned cams, the cylinder also houses a three-part piston assembly which is sometimes referred to collectively as 'the piston', or can also be referred to in terms of its individual parts or assemblies under the names 'inner piston', 'middle piston', and 'outer' (or 'main') piston. In effect, the 'piston' is actually an inner piston mounted in the bore of a middle piston which is then mounted in the bore of the outer piston therefore in effect: a piston within a piston within a piston as described in upcoming Drawings 2, 3, 4, 5, 17 and FIG. 2 shows the inner piston assembly. The piston head 13 mounts two identical cam lugs 12 on each of its two side flats. Pump shaft 14 is attached to the piston head by insertion in to a hole through its center where it is then pinned. Seal 15 is pressed on to the shaft adjacent to a shoulder and held in position by ring clip 16.

Figure 3:
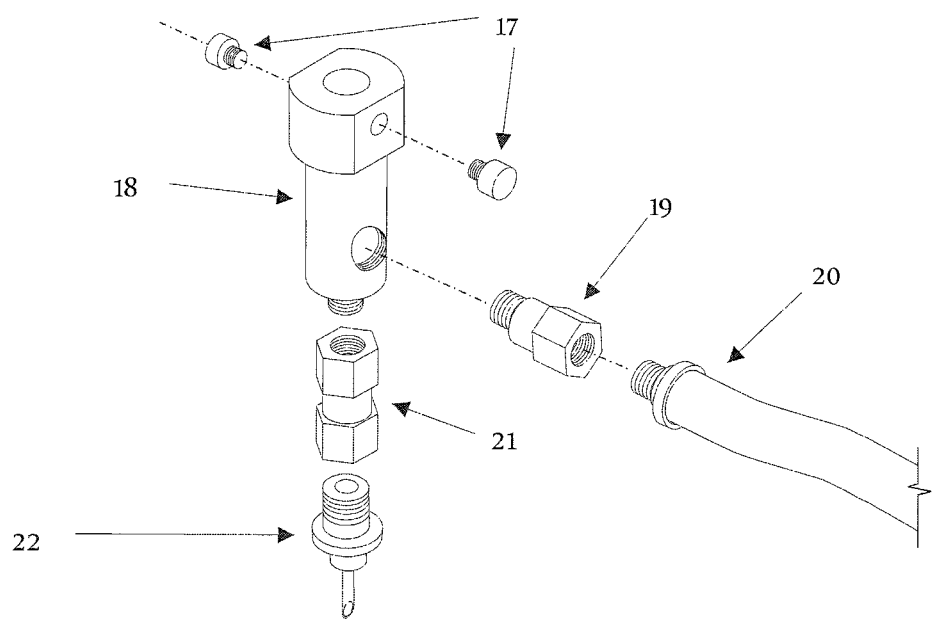
FIG. 3 is an exploded perspective view of the middle piston.

FIG. 3 shows the middle piston assembly. The piston body 18 is bored out to fit the seal of the inner piston and, like the inner piston, has two identical cam lugs 17 threaded into each of its two side flats. On the lower portion of piston body 18, just below the stroke limit of the inner piston, is a threaded hole into which check valve 19 is screwed. Middle piston body 18 has a hole bored through its entire length, and on its bottom end includes a threaded nipple upon which check valve 21 is screwed; needle 22 is then threaded on to check valve 21.

When the assembled inner piston is installed within the assembled middle piston (as indicated in upcoming FIG. 5), and then supplied with fluid flowing through hose 20 connected to check valve 19, that fluid will flow through needle 22 each time that the inner piston descends. Because check valve 19 only allows flow towards the piston body, and check valve 21 only allows flow towards the needle, each upward stroke of the inner piston will result in fluid re-charge. In the preferred embodiment of the present invention hose 20 is connected to a reactant storage tank (not shown) which stores a reactant such as ethylene glycol that flows by gravity through hose 20.

Figure 4:
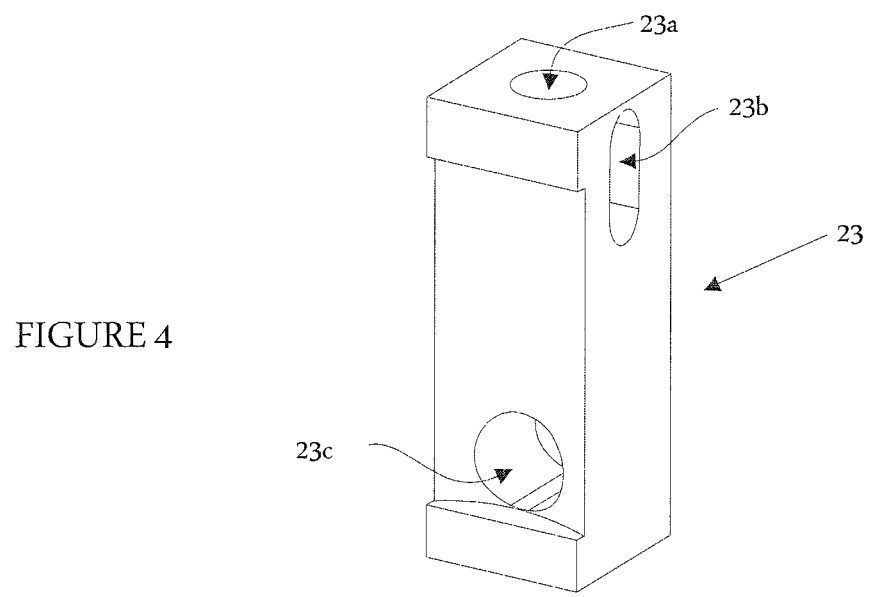
FIG. 4 is a perspective view of the outer piston.

FIG. 4 shows the outer piston 23, which is a single piece. Hole 23a is the bore within which middle piston assembly (25) is mounted. Slot 23b allows up-and-down motion of the check valve (19). This slot is required because of the relative motion between the middle and the outer pistons, the reactant supply assembly (19,20) passes through this slot thus allowing this motion without interference. Hole 23c is a cylindrical cavity within the main piston which is used to contain the incendiary sphere while it is being processed by the apparatus.

FIG. 5 shows the parts referenced in FIGS. 2, 3 and 4 in their assembled states. FIG. 5A indicates the assembled inner piston 24 and the assembled middle piston 25. FIG. 5B shows all three pistons 65 in their assembled and mounted state. A more detailed examination of the operative interrelationship between the three pistons will be discussed in reference to FIG. 18.

Figure 6:
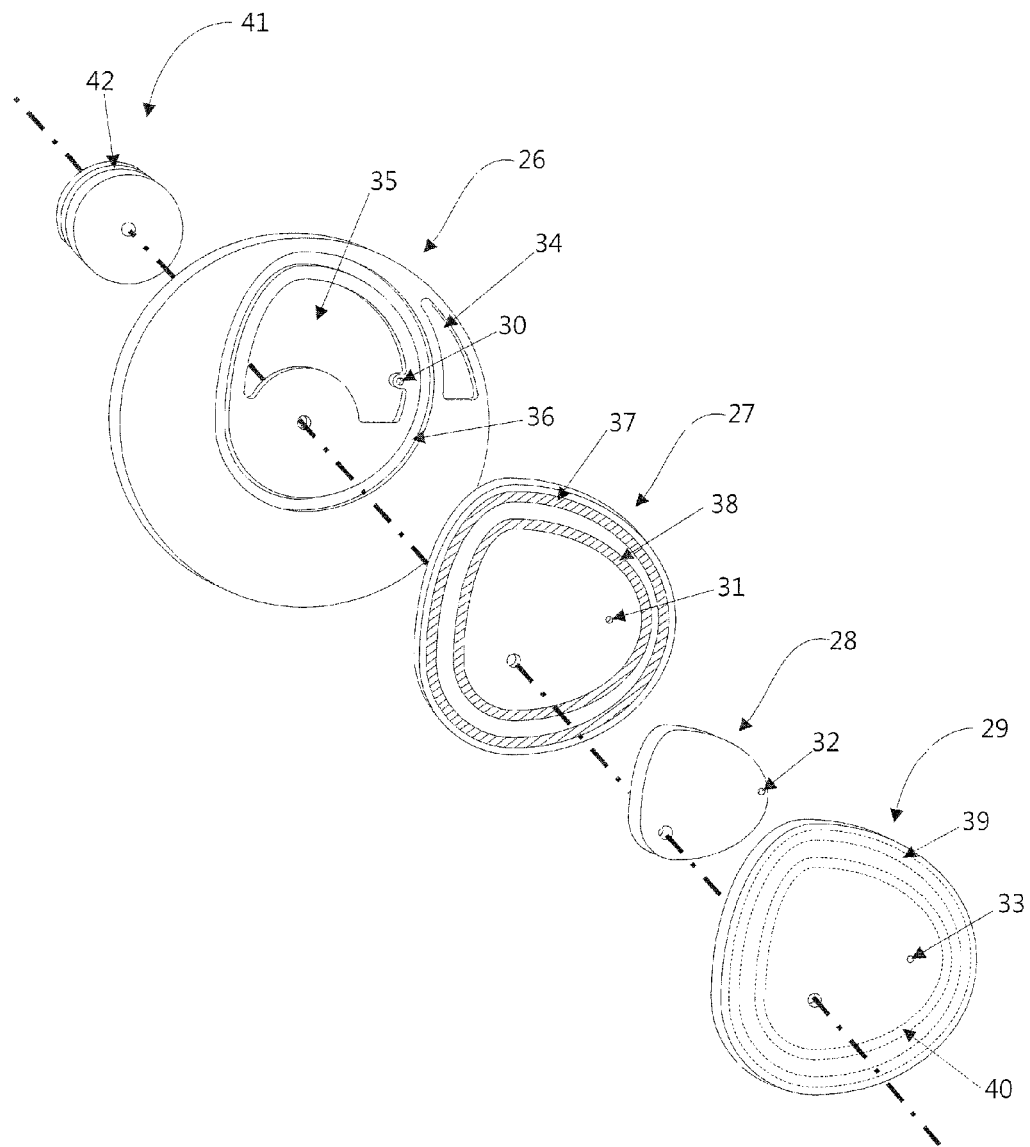
FIG. 6 is an exploded perspective view of the cam assembly.

FIG. 6 shows the five objects which are mounted in alignment on a single shaft to form the cam assembly; three of these five objects act as cams and, of the remaining two, one is a spacer and the other is a pulley. The location of the main shaft (part 43 in following FIG. 7A) is represented by a dashed line. The circular pulley 41 is mounted rearmost on the shaft; this pulley is used for the purpose of rotating the shaft and the cams attached to the shaft. In the preferred embodiment, this pulley is engaged by a V-belt in groove 42 which is driven by a similar pulley that is mounted on the shaft of an electric motor (not shown). It is understood that any variation of pulley, gear, or similar drive-fitting suited to any other means of rotation, be it manually, electrically, pneumatically, or in any other way driven, may be substituted in replacement of pulley 42 without any differentiating effect upon the apparatus herein described. Next in line is main-cam 26. This main-cam is used to drive the reciprocating motion of the main piston (23). The other two cams 27 and 29 directly drive the two other pistons (24 and 25) by engagement of attached cam lugs (12 and 17). The main-cam drives the main piston through the interceding engagement of a connecting rod (shown in FIG. 15); as previously noted, this connecting rod moves within a clearance slot (7) in the back surface of the cylinder. The main purpose of this offset connection is to limit the size of the main-cam. One of the two lugs of the connecting rod mounts in a hole (not shown) in the back top of the main piston, and the other lug rides in groove 36 of the main-cam. As shown, the main-cam has two areas 34 and 35 cut out of its surface. The purpose of these cut outs is to statically and dynamically balance the entire cam assembly by means of reduction of this cam's mass. Reviewing the three remaining parts 27, 28, 29 which make up the cam assembly it is readily noted that there exists, relative to their centers of rotation, much greater mass in their upper right sector than in their lower left. Since this otherwise off-center mass would, when rotated, cause unacceptable vibration of the entire unit, it is necessary to remove mass from the main-cam in order to bring the overall cam assembly into a balanced state. As shown, the mass is removed from the main-cam in the same x-y sectors that it is greater in the other parts. The next in line are back-middle cam 27, then spacer 28, then front-middle cam 29. These two cams, separated by a spacer, are mirror images of one another. Each of the two cams has two grooves (about half the cam's thickness in depth) engraved in its surface. The cam grooves in back-middle cam 27 are indicated by hatched lines 37 and 38 while the cam grooves in front-middle cam 29 are indicated by dotted lines 39 and 40; it is therefore seen that the grooves in these two cams face towards each other. The outermost grooves (furthest from center of rotation) engage cam lugs (17) which are attached to middle piston assembly (25), and the innermost grooves engage cam lugs (12) which are attached to inner piston assembly (24). To function correctly, the three cams and one spacer must all be correctly aligned relative to one another when mounted on the main shaft this is accomplished with the aid of alignment holes 30, 31, 32, and 33. Alignment of pulley 41 is not necessary because it is symmetrical.

Referring to FIG. 7 we see a side view of the assembled cam. As shown, pulley 41 is mounted rearmost on main shaft 43 followed by main-cam 26. In the preferred embodiment, pulley 41 and main-cam 26 are bolted together and so to each other are the three remaining parts 27,28 and 29, and, all five parts are mounted along a single keyway in the main shaft. It can be noted that there is a space between cams 26 and 27. When the unit is assembled, this space is taken up by the back cylinder wall—in other words, the main-cam is outside (or behind) the cylinder, while the two middle cams are both inside the cylinder, meaning that these two middle cams are mounted between the front and back walls of the cylinder. Capping the front end of the main shaft is miter gear 44 which forms part of the incendiary feeding system which will be further explained.

FIG. 8 is a schematic front view of the cam assembly which indicates the centerlines of the cam grooves that control the reciprocating motion of each of the three pistons. Here is shown both the relative relationship between the three cam grooves (each to the other) and also the resulting sequence of movement of the pistons, and, determined by this sequence the various effects of piston movements upon the incendiary capsule. Also indicated (in rectangles) are the four right-angle cam positions according to direction of rotation, which is anti-clockwise. Beginning at zero degrees, we see that the main piston is in the full down position at this point, and for most of their reciprocation, the other two pistons are in their 'normal' positions relative to the main piston 'normal' meaning that the middle piston is at its maximum linear distance away from the main piston (this could also be described as the 'needle withdrawn' position), and, the inner piston is at its maximum distance from the middle piston (which could also be described as the 'stroke up' position). Proceeding anti-clockwise from the zero position, and ignoring for the moment both the ball-feeder and the ball-ejection functions (whose mechanisms have not yet been referenced in these drawings), it may be noted that all three pistons return to the full up position during the first 90 degrees of cam rotation, During the next 90 degrees (from 90 to 180) while the main piston remains in the full up position (because it's cam groove is a constant radius), the middle cam (needle) begins first to descend then puncture the sphere, then the inner piston (pump) begins to descend relative to the middle piston. During the next 90 degrees (from 180 to 270) the main piston begins it's down stroke, then the inner piston (pump) completes it's down stroke relative to the middle piston thus injecting the reactant, then, the middle piston returns to the 'normal' position, thus withdrawing the needle from the incendiary sphere. During the last 90 degrees (270 to 360/zero), while all three pistons remain in the 'normal' position relative to one another, the cam assembly descends through the latter half of its downward stroke and ejects the incendiary, at which point the cams and the pistons they control complete the return to the starting point (360/zero degrees). The entire process is then exactly repeated with each subsequent rotation.

Referring to FIG. 9, in FIG. 9A is shown the rotary-feeder 46. The incendiary spheres settle one by one into semi-circular cavities 46b (one of five such) of feeder 46. In the preferred embodiment, the rotary-feeder has five anus as shown, but it must be noted that this design will function equally well with a number of arms other than five. The feeder fits inside rotary-feeder housing 47; as the feeder is rotated anti-clockwise, any incendiary sphere that is encompassed in one of these circular cavities will eventually come into contact with feeder-tab 47a (FIG. 9B) which is part of, or attached to, feeder housing 47—as rotary-feeder 46 is then further rotated, the incendiary is forced in an outward radial direction. In actuality, it is the rotational contact with the outside of the as represented by 46a that forces movement of the sphere, the tab 47a simply blocks the sphere from moving in any other direction. As indicated as 46c there is a space in the vertical center of each arm of the feeder; this is the space that provides unimpeded clearance for feeder-tab 47a; because of this clearance, when feeder 46 is installed in its housing and rotated, it makes no contact with feeder-tab 47a. The working of this mechanism is further discussed in reference to upcoming FIG. 13.

Figure 10:
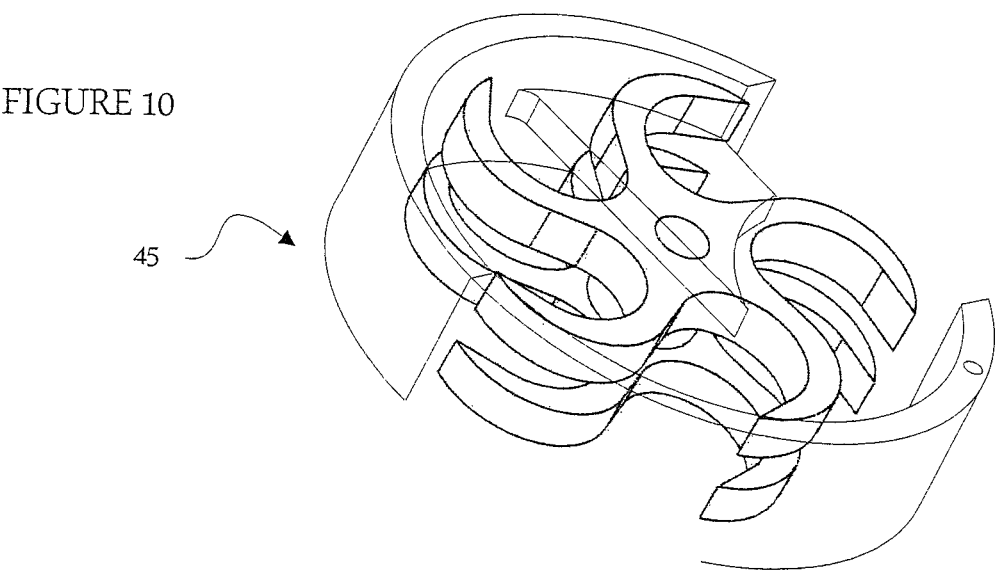
FIG. 10 is a perspective view of the rotary-feeder mounted inside the rotary-feeder housing.

FIG. 10 is a depiction of the rotary-feeder (46) when it has been installed in the rotary-feeder housing (47) to form rotary-feeder assembly 45.

Figure 11:
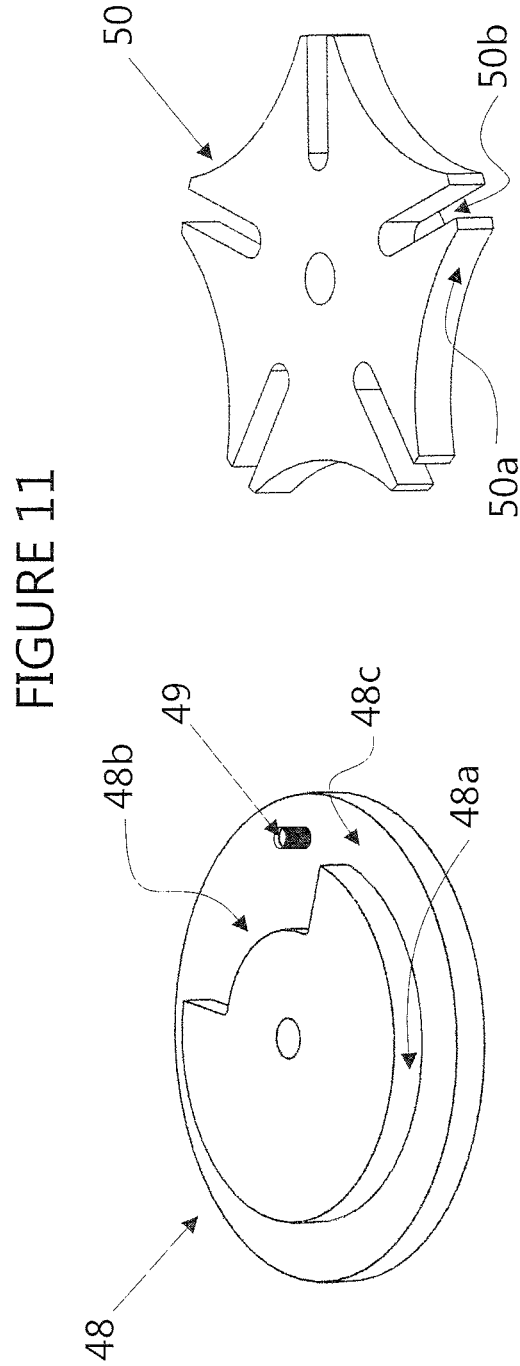
FIG. 11 is a perspective view of the two elements of the Geneva drive gear.

FIG. 11 shows the two gears which constitute the 'Geneva drive' which is used to intermittently drive the rotation of the rotary-feeder. Here is seen the 'Geneva drive gear' 48 and the 'Geneva driven gear' 50 (which is referred to as the 'Geneva cross' or just 'the cross). As shown, the Geneva drive gear includes a top section 48a which forms a complete circle except where that circle is notched out at 48b. Aligned in the center of that notch is drive pin 49. Also shown in FIG. 11 is Geneva cross 50; as seen, the Geneva cross includes five identical semi-circular surfaces, one of which is shown as 50a. The cross also includes five identical radial notches, one of which is shown as 50b. This drive system, when mounted in engaged contact, and rotated by drive gear 48 will produce the intermittent partial rotation of Geneva cross 50. As noted, the cross includes five radial notches, these notches are exactly arranged at one per each one fifth of a circle (one each 72 degrees). It is understood, although if so, the exact geometry of the two parts would need to be modified accordingly, that this type of intermittent drive could be designed and built for other incremental rotations if desired. For instance, if 90 degrees was desired, the Geneva cross would have four evenly spaced notches, if 45 degrees then eight evenly spaced notches, etc. The reason that a 72 degree incremental drive is depicted here is because the preferred embodiment of the present invention presumes a rotary feeder with five arms. The Geneva cross is mounted directly below, and on the same shaft, as the rotary-feeder (as will be further observed in discussion of FIG. 14).

FIG. 12 depicts the Geneva drive in operation. In FIG. 12A, the drive pin 49 of the anti-clockwise rotating drive gear 48 is just making contact with the outer opening of one of the radial notches of Geneva cross 50. As rotation of gear 48 continues, drive pin 49 rides in the notch and forces the Geneva cross to rotate exactly 72 degrees by the time drive pin 49 emerges from the cross as depicted in FIG. 12B. From that point and during all that period that gear 48 continues to rotate until it again reaches the position depicted in FIG. 12A the Geneva cross remains stationary. In fact, during that period it is incapable of rotation; this is because, with the exception of times when it is being driven by pin 49, one of its five concave surfaces is always mated to the convex surface of the drive gear. The purpose of the notch (48b) is to allow clearance for the Geneva cross to rotate any time it is rotated by the drive pin; at all other times the Geneva cross remains locked against rotation. Observers may note the apparent contradiction when comparing FIG. 12 to FIG. 10, that, while the rotary feeder is designed for anti-clockwise rotation, the Geneva cross which drives it is depicted as rotating in a clockwise direction this is because FIG. 12 is an up view, thus, when this assembly is installed upside down it will effect anti-clockwise movement of the rotary-feeder.

Figure 13:
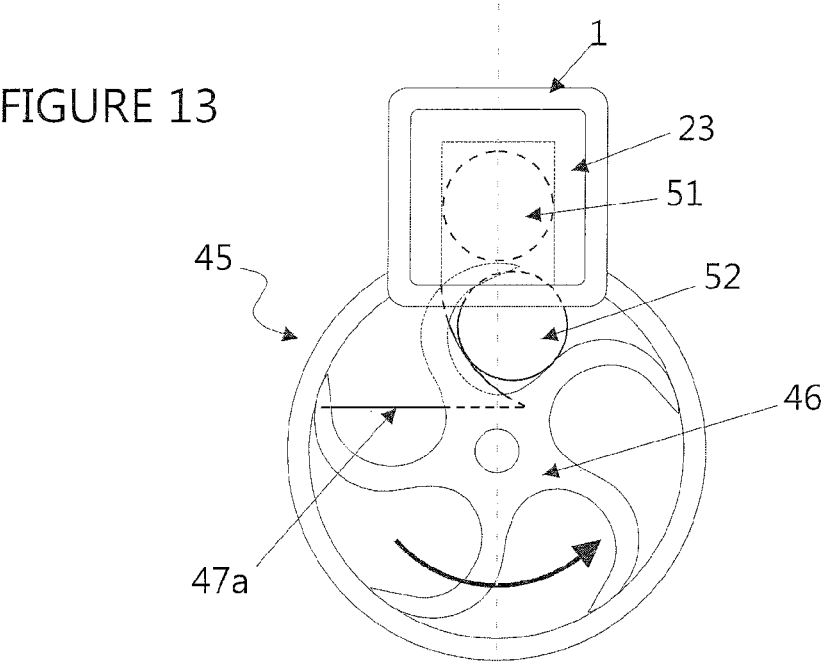
FIG. 13 is a down view of the rotary-feeder attached to the cylinder.

FIG. 13 depicts the incendiary feeding system as mounted for use. Main Piston 23 is installed within cylinder 1, and rotary-feeder assembly 45 is attached in position to the cylinder. At the point depicted, one on the numerous incendiary spheres (52) from the hopper, which has fallen into one of the cavities of the feeder, has, as a result of the anti-clockwise rotation of rotary-feeder 46, just made contact with the concave surface of feeder tab 47a. As the feeder then completes its 72 degree rotation, incendiary 52 is pushed in a radial direction until it is fully deposited in position 51 (hatched line), which is the center of the cavity (23c) of the main piston as depicted in FIG. 4.

Figure 14:
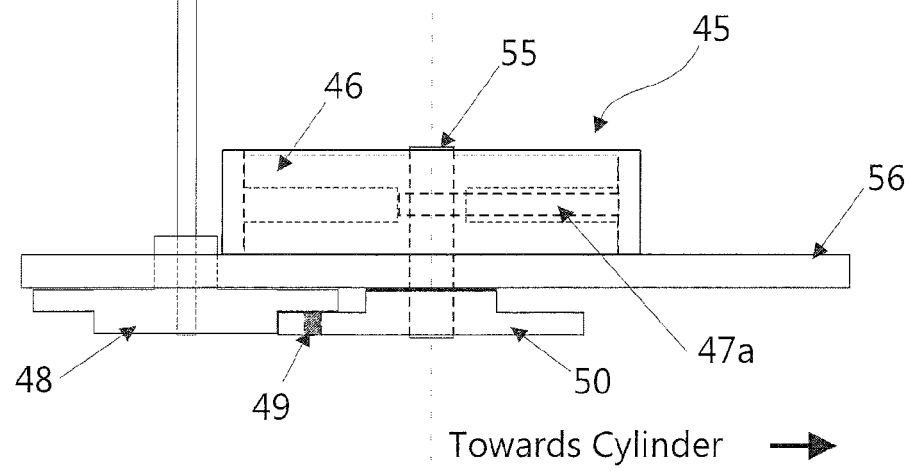
FIG. 14 is a side view of the items shown in FIGS. 10, 11 and 12 when assembled.

FIG. 14 shows the drive train of the incendiary feeding system, the main components of which have been described in reference to FIGS. 9 13. Feeder mount plate 56 attaches to the cylinder. Shaft 55 passes through this mount plate and is connected to rotary-feeder 46 on its upper end and to Geneva cross 50 on its lower end. Auxiliary drive shaft 54 also passes through mount plate 56 attached on the lower end of shaft 54 is Geneva drive 48, and on its upper end it is capped by miter gear 53. Within feeder assembly 45 is shown feeder tab 47a. Continual rotation of shaft 54 which turns gear 48 by means of pin 49 results in the timed and co-ordinate rotation of the incendiary feeding system.

Figure 15:
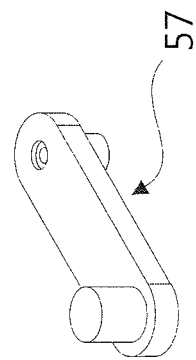
FIG. 15 is a perspective view of the connector rod assembly.

FIG. 15 shows connecting rod assembly 57, which is the interactive link between the main piston and the groove in the main-cam as previously discussed.

Figure 16:
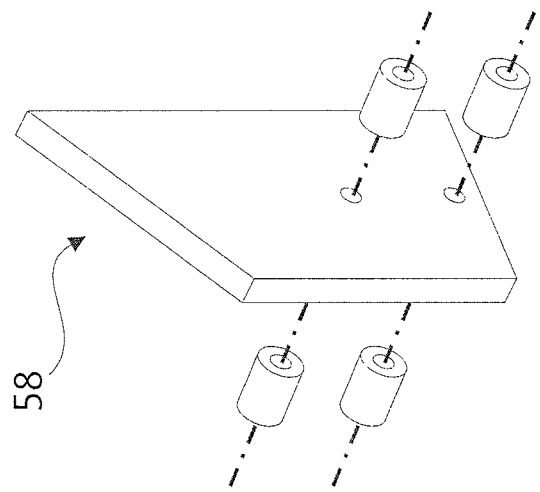
FIG. 16 is a perspective view of the ejector plate assembly.

FIG. 16 show ejector plate assembly 58. This assembly consists of one plate that is tapered on its upper end, and four spacers.

FIG. 17 depicts the incendiary ejector system in use. Note slot 59 (not previously shown)—the purpose of this slot is to provide clearance for the ejector plate to enter the main piston. FIG. 17A is an approximate depiction of the relationship between main piston 23 and ejector 58 as they sit inside the cylinder when the piston is in TDC position. FIG. 17B is a depiction of the relationship between piston 23 and ejector assembly 58 at the time that the main piston reaches its full down position—at which time any incendiary capsule that is within the piston's cavity will meet the sloped surface of the ejector plate and be pushed out of that cavity.

FIG. 18 is used to explain a few fine points regarding the design of piston assembly 65. In FIG. 18A is shown the hole 66 in main piston 23 which engages the connecting rod (57) to the main cam (26). In FIG. 18B is shown the piston assembly in its 'normal' position. As previously described, in the 'normal' position, the middle piston, mounted within bore 62 of the main piston 23, is in the 'up' position relative to the main piston, thus the needle is 'withdrawn'—and the inner piston, mounted within bore 61 of the middle piston, is in the 'up' position relative to the middle piston, thus maintaining a ready charge of reactant when in fill operation. The pin 60 secures inner piston head 13 to its shaft, the bore 61 in the middle piston provides sufficient distance above check valve 19 for the system to re-charge. Check valve 19 is at the upper end of slot 23b thus the middle piston is five to move downwards relative to the main piston as it must to force needle 22 into the incendiary sphere. The bore 62 in the main piston does not extend all the way to cavity 23c but is connected only by small hole 63 which is just large enough to pass needle 22, thus, when the needle is forcibly withdrawn the ball must come off of the needle. It should be noted that when piston assembly 65 is actually installed for use; inner piston head 13 and middle piston body 18 are both rotated 90 degrees from the orientation depicted in FIG. 18 so that cam lugs 12 and 17 properly align with and engage the cam grooves.

FIG. 19 represents an example only 64 of one possible hopper assembly that may be employed with the present invention. FIG. 19A represents such a hopper assembly by itself and it includes agitator motor 64a, hopper bottom 64b, and feeding tube 64c. FIG. 19B shows the hopper in its installed position. As discussed previously in this document, incendiaries loaded in hopper assembly 64 become agitated or stirred by motor 64a and thereby enter incendiary feeding tube 64c; these incendiaries line up in series within feeding tube 64c; when the lowest incendiary in line becomes presented with an empty cavity of the rotary feeder, that incendiary falls by gravity into that empty cavity.

Figure 20:
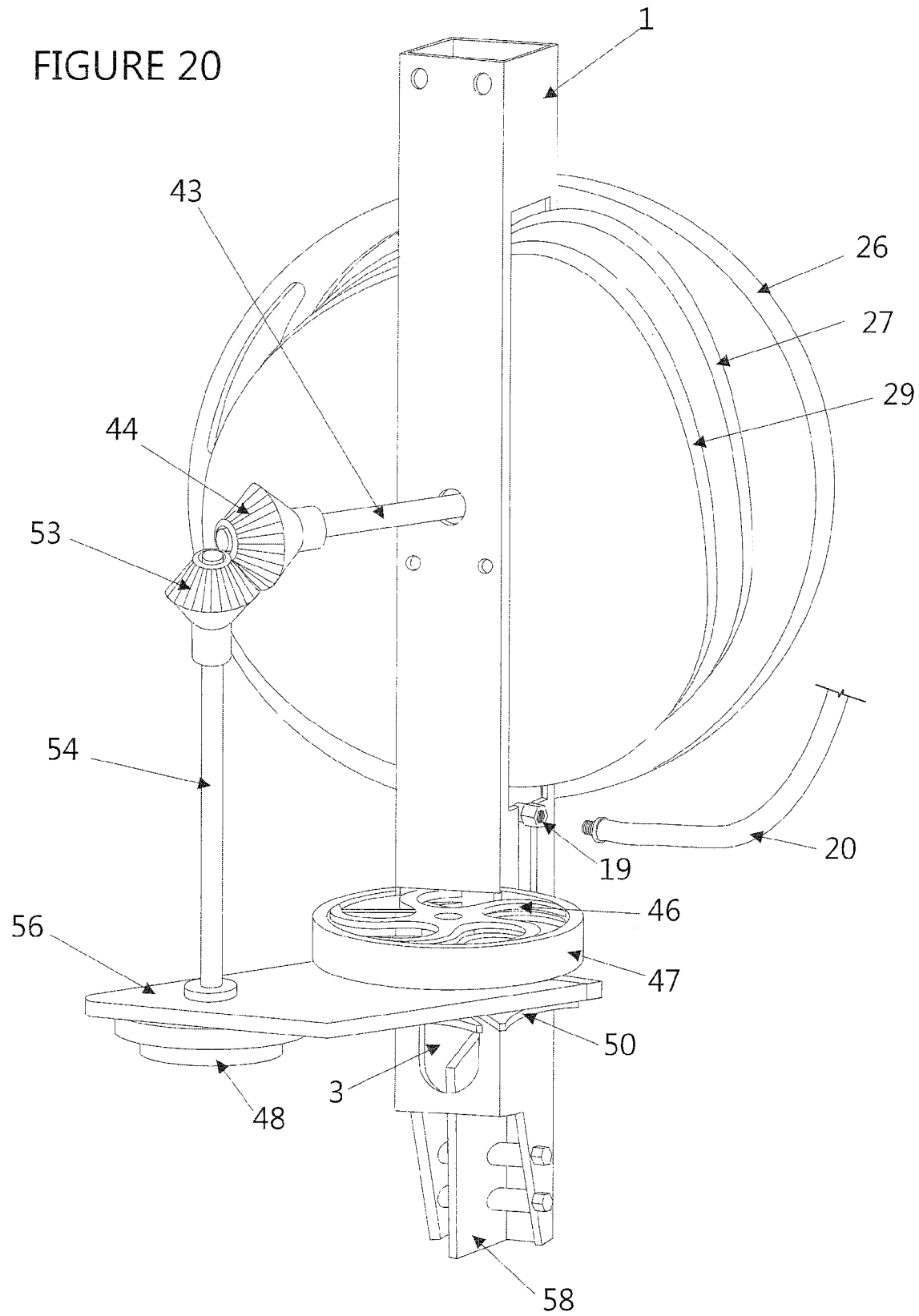
FIG. 20 is a perspective view of the assembled apparatus.

FIG. 20 is a final assembly drawing of the present invention. Excluding piston assembly 65 the majority of the main components discussed in this document are in evidence.

What is claimed is:

1. An apparatus for processing incendiary capsules, said apparatus comprising (a) a hollow cylinder, and (b) a piston or a plurality of co-axial pistons placed for reciprocating motion within said cylinder, and (c) means of feeding said incendiary capsules to a set location within said cylinder during a desired phase of said reciprocating motion of said piston or said plurality of co-axial pistons, and (d) injection means located within said cylinder, and (e) means of expelling said incendiary capsule from said cylinder;
   wherein said reciprocating motion of said piston or said plurality of co-axial pistons is driven by a cam or a plurality of co-axially mounted cams.

2. The apparatus of claim 1 wherein said means of feeding said incendiary capsules is a multi-cavity feeding device.

3. The apparatus of claim 2 wherein the motion of said multi-cavity feeding device is rotary.

4. The apparatus of claim 3 wherein the said rotation of said multi-cavity feeding device is operatively connected to the reciprocating motion of said piston or to said plurality of co-axial pistons.

5. The apparatus of claim 4 wherein said operative connection includes a Geneva drive mechanism to provide intermittent rotation of said multi-cavity feeding device.

6. The apparatus of claim 1 wherein said injection means is comprised of a hollow needle through which a reactant comprising ethylene glycol, flows.

7. The apparatus of claim 1 wherein said incendiary capsule is a sphere.

8. The apparatus of claim 1 wherein said incendiary capsule contains an incendiary material comprising potassium permanganate.

9. The apparatus of claim 1 whereby the means of expelling said incendiary capsule from said cylinder is in contact with an inclined surface that serves as a ramp to force the said incendiary from the said cylinder.

10. The apparatus of claim 1 wherein said hollow cylinder is generally rectangular in cross-section.

11. An apparatus for processing incendiary capsules, said apparatus comprising (a) a hollow cylinder, and (b) a piston or a plurality of co-axial pistons placed for reciprocating motion within said cylinder, and (c) means of feeding said incendiary capsules to a set location within said cylinder during a desired phase of said reciprocating motion of said piston or said plurality of co-axial pistons, and (d) injection means located within said cylinder, and (e) means of expelling said incendiary capsule from said cylinder;
   wherein at least one of said plurality of co-axial pistons moves telescopically within at least a portion of one other of said plurality of co-axial pistons.

12. The apparatus of claim 11, wherein said means of feeding said incendiary capsules is a multi-cavity feeding device.

13. The apparatus of claim 12, wherein the motion of said multi-cavity feeding device is rotary.

14. The apparatus of claim 13, wherein the said rotation of said multi-cavity feeding device is operatively connected to the reciprocating motion of said piston or to said plurality of co-axial pistons.

15. The apparatus of claim 14, wherein said operative connection includes a Geneva drive mechanism to provide intermittent rotation of said multi-cavity feeding device.

16. The apparatus of claim 11, wherein said injection means is comprised of a hollow needle through which a reactant comprising ethylene glycol, flows.

17. The apparatus of claim 11, wherein said incendiary capsule is a sphere.

18. The apparatus of claim 11, wherein said incendiary capsule contains an incendiary material comprising potassium permanganate.

19. The apparatus of claim 11, wherein said reciprocating motion of said piston or said plurality of co-axial pistons is driven by a cam or a plurality of co-axially mounted cams.

20. The apparatus of claim 11, whereby the means of expelling said incendiary capsule from said cylinder is in contact with an inclined surface that serves as a ramp to force the said incendiary from the said cylinder.

21. The apparatus of claim 11, wherein said hollow cylinder is generally rectangular in cross-section.

22. An apparatus for processing incendiary capsules, said apparatus comprising (a) a hollow cylinder, and (b) a piston or a plurality of co-axial pistons placed for reciprocating motion within said cylinder, and (c) means of feeding said incendiary capsules to a set location within said cylinder during a desired phase of said reciprocating motion of said piston or said plurality of co-axial pistons, and (d) injection means located within said cylinder, and (e) means of expelling said incendiary capsule from said cylinder; wherein at least one of said plurality of co-axial pistons moves telescopically within at least a portion of one other of said plurality of co-axial pistons;
   wherein the innermost of said plurality of co-axial pistons serves as a pump.

23. The apparatus of claim 22, wherein said means of feeding said incendiary capsules is a multi-cavity feeding device.

24. The apparatus of claim 23, wherein the motion of said multi-cavity feeding device is rotary.

25. The apparatus of claim 24, wherein the said rotation of said multi-cavity feeding device is operatively connected to the reciprocating motion of said piston or to said plurality of co-axial pistons.

26. The apparatus of claim 25, wherein said operative connection includes a Geneva drive mechanism to provide intermittent rotation of said multi-cavity feeding device.

27. The apparatus of claim 22, wherein said injection means is comprised of a hollow needle through which a reactant comprising ethylene glycol, flows.

28. The apparatus of claim 22, wherein said incendiary capsule is a sphere.

29. The apparatus of claim 22, wherein said incendiary capsule contains an incendiary material comprising potassium permanganate.

30. The apparatus of claim 22, wherein said reciprocating motion of said piston or said plurality of co-axial pistons is driven by a cam or a plurality of co-axially mounted cams.

31. The apparatus of claim 22, whereby the means of expelling said incendiary capsule from said cylinder is in contact with an inclined surface that serves as a ramp to force the said incendiary from the said cylinder.

32. The apparatus of claim 22, wherein said hollow cylinder is generally rectangular in cross-section.

* * * * *